United States Patent Office 3,461,558
Patented Aug. 19, 1969

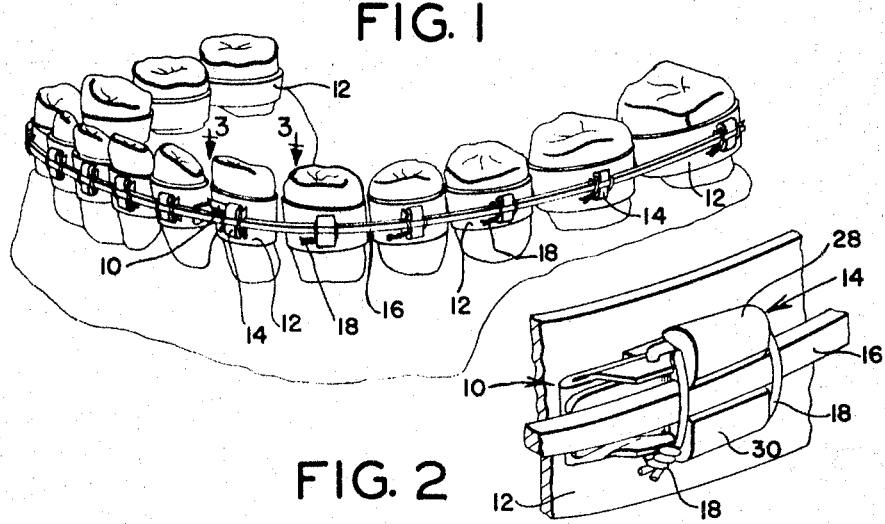
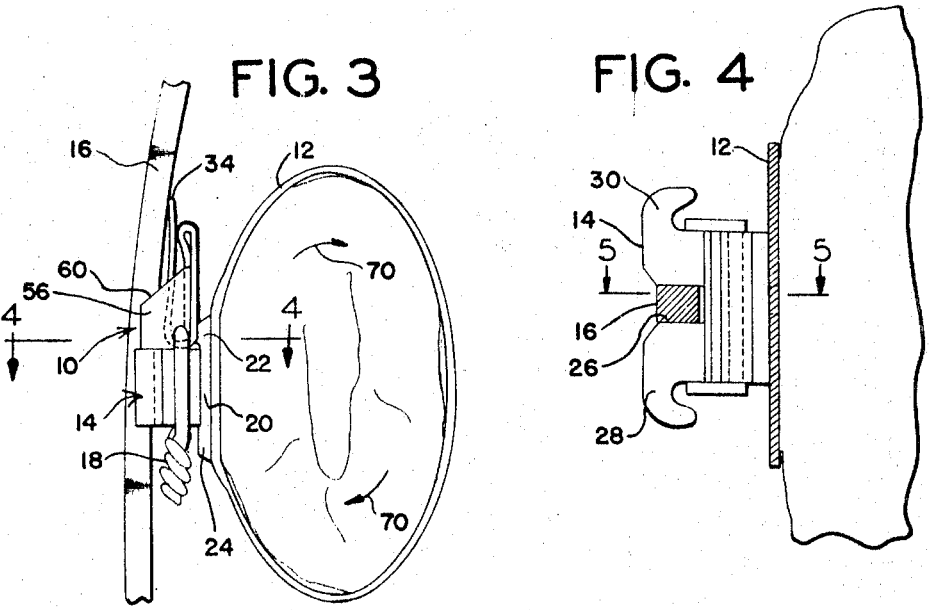
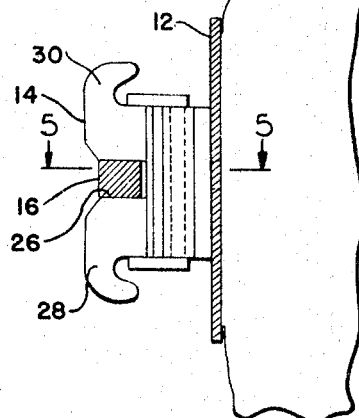
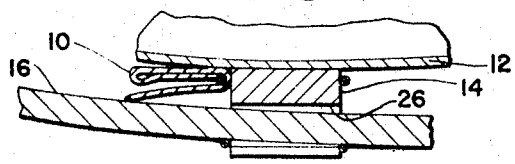
FRANK R. MILLER
RAYMOND E. DILLBERG
INVENTORS.

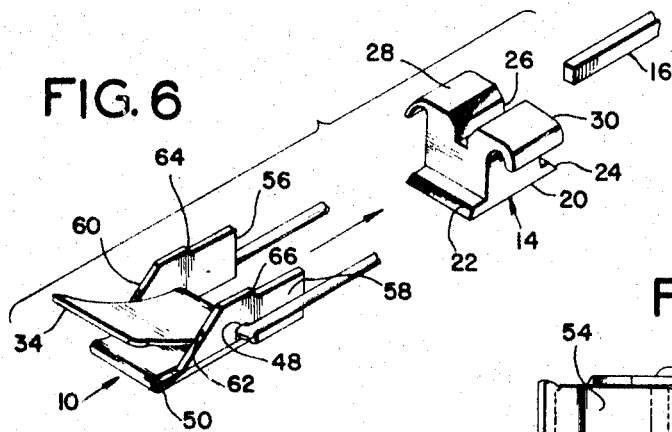
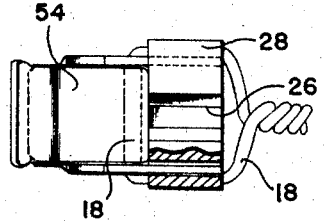
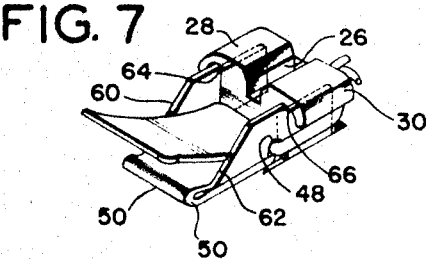
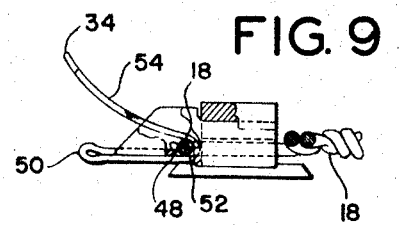
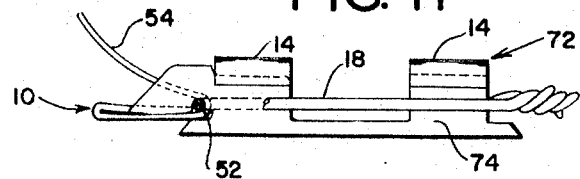
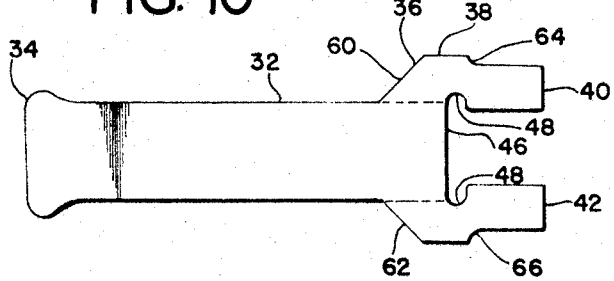

3,461,558
ORTHODONTIC ROTATION APPLIANCE
Frank R. Miller, 502 Mount Olive, Bradbury, Calif.
91010, and Raymond E. Dillberg, 6152 N. Encinita,
Temple City, Calif. 91780
Filed Apr. 3, 1962, Ser. No. 184,759
Int. Cl. A61c 7/00
U.S. Cl. 32—14    4 Claims The present invention relates generally to an orthodontic rotation appliance; more particularly, the invention relates to an orthodontic rotation spring for applying controlled torque or torsional forces to a tooth to correct the position of the tooth.

Orthodontia has long been utilized for altering the positions of teeth to provide a more desirable appearance, to correct malocclusion of teeth, and to correct facial deformities. Various orthodontic appliances have been employed to apply corrective forces to respective teeth to reposition the teeth in accordance with the direction and extent of the applied forces. Such appliances have generally or typically been utilized with conventional associated components, such as bands secured as by cementing about respective teeth, brackets secured as by welding to the bands, and arch wires which extend about a plurality of teeth and are disposed in grooves in the respective brackets. The appropriate installation of appliances relative to the arch wire and the brackets results in the transmission of appropriate corrective forces to respective teeth, thereby effecting the desired re-positioning of teeth over a period of time.

One type of corrective repositioning of teeth is the rotation of the tooth about its axis to cause it to assume its proper relationship with other teeth. This requires the application of torsional force or control torque to the tooth. Prior art appliances for this purpose have been characterized by certain shortcomings and disadvantages. Among these are the necessity for removing conventional associated components from the tooth or teeth in order to effect installation or removal of the rotation appliance. Another shortcoming is that prior devices have been capable of effecting tooth rotation only through relatively small angles without requiring adjustment or repositioning. Many prior appliances have been incapable of applying the corrective torsional force to a tooth without applying undesired force which may effect undesired repositioning of a tooth.

It is therefore an object of the present invention to provide an orthodontic rotation appliance which is capable of applying corrective or torsional force to a tooth to effect corrective rotation of the tooth in an effective and efficient manner.

An object of the invention is the provision of an orthodontic rotation appliance which is readily installable and removable without requiring the removal of associated conventional components from the tooth or mouth of a patient.

An object of the present invention is to provide an orthodontic rotation appliance according to the foregoing object which is installed by assembly to a conventional tooth bracket by a ligature wire.

It is an object of the invention to provide an orthodontic rotation appliance which is capable of effecting corrective rotation of a tooth through a relatively wide angle without requiring adjustment, removal, reinstallation, or repositioning.

Another object of the invention is the provision of an orthodontic rotation appliance which applies distinct, discrete, corrective rotational force to a tooth without applying any undesired force to the tooth.

Other objects, features, and advantages of the present invention will become apparent to those versed in the art from a consideration of the following description, the appended claims, and the accompanying drawings, wherein:

FIGURE 1 is a diagrammatic perspective view showing conventional bands, brackets, and an arch wire mounted on a plurality of teeth, with the appliance of the present invention assembled in operative relation relative to a tooth;

FIGURE 2 is an enlarged partial perspective view showing the orthodontic rotation appliance of the invention assembled in operative relation with a conventional bracket and arch wire;

FIGURE 3 is an enlarged partial view taken at line 3—3 of FIGURE 1;

FIGURE 4 is a sectional view taken at line 4—4 of FIGURE 3;

FIGURE 5 is a sectional view taken at line 5—5 of FIGURE 4;

FIGURE 6 is an exploded perspective view of the rotation appliance of the invention and cooperating conventional components;

FIGURE 7 is a perspective view of the rotation appliance of FIGURE 6 operatively assembled with a conventional tooth bracket and a ligature wire;

FIGURE 8 is a plan view, partially in section, of the assembly of FIGURE 7;

FIGURE 9 is an elevational view, partially in section, of the assembly shown in FIGURES 7 and 8;

FIGURE 10 is a plan view of a metal blank from which the rotation appliance or spring is formed; and FIGURE 11 is an elevational view similar to the view of FIGURE 9, showing the rotation appliance of the invention in assembled relation with a type of tooth bracket different from the tooth bracket of FIGURE 9.

Referring to the drawings, and particularly to FIGURES 1 through 4, an orthodontic rotation spring 10 according to the invention is shown in operative assembly with conventional components. FIGURE 1 shows a set of teeth of a patient, about each of which a band 12 is secured. A tooth bracket 14 is secured as by welding to each band. An arch wire 16 extends about the teeth and is received in grooves in the respective brackets, as shown. The arch wire is secured to each bracket 14 in conventional manner by a ligature wire 18.

The tooth band being cemented securely to the tooth and the tooth bracket being welded to the band, a rigid structure solidly secured to the tooth is provided.

The configuration of the tooth bracket 14 may preferably be that which is best shown in FIGURES 2, 4, and 6. It is preferably fabricated of an appropriate material such as stainless steel. The bracket has a flat base portion 20 from which extend end or ledge portions 22, 24. A rectilinear longitudinal groove 26 is defined in the outer portion of the bracket. The groove and the arch wire are formed with accurately defined widths to provide an accurate fit. Wing portions 28, 30, extend laterally from the upper or outer portion of the bracket. The outer end portions of the respective wing portions extend downwardly, as shown, for the purpose of retaining ligature wires in the well-known manner indicated in FIGURES 2 and 8.

The rotation appliance or spring 10 of the invention is formed from a blank of the type shown in FIGURE 10, the blank preferably being fabricated of resilient stainless steel. As shown, the blank has an elongated strip or base portion 32, a widened rounded outer end portion 34, a steeply tapered portion 36, a wide portion 38, and a pair of longitudinally extending leg portions 40, 42. The leg portions and a transverse edge 46 define a generally rectilinear opening, as shown, and rounded notches 48 extend from the opening into the respective leg portions.

The rotation spring 10 is formed into the configuration shown in FIGURES 6, 7, and 9 by bending the blank of FIGURE 10. The elongated strip or body portion 32 is bent or folded back upon itself to effect a relatively sharp bend, as indicated at 50, and is then bent in the opposite direction to provide a relatively more gradual roll or fold, as indicated at 52. The outer portion of strip portion 32 and the rounded end portion 34 constitute an extending bowed portion 54 of the formed rotation spring.

Side walls 56, 58, of the spring are formed by bending the leg portions 40, 42 (FIGURE 10) along the dotted line. The side walls 56, 58, have inclined edges 60, 62, respectively, and have shoulders 64, 66, respectively, defined in their upper edges. The rounded notches 48 (FIGURE 10) provide rounded openings in the side walls adjacent to and in registration with the fold or roll 52 of the spring.

With the rotation spring 10 assembled with the bracket 14 and secured thereto by a ligature wire, in the manner shown in FIGURES 8, and 9, the wide walls 56, 58, of the spring fit against the side of the bracket and beneath the wing portions 28, 30. The portion of the spring beneath the fold or roll 52 is seated on the ledge portion 22 of the bracket, and the shoulders 64, 66, of the side walls abut the end surface of the wing portions 28, 30, respectively. It will be readily understood from the geometrical relations of the parts that with the rotation spring secured in this position by means of the ligature wire, the spring is solidly secured to the bracket, thereby substantially preventing relative movement between the spring and the bracket.

The ligature wire 18 extends through the rounded openings or notches 48, through the fold or roll 52 of the spring which is in registration with the openings 48, extends about the bracket under wing portions 28, 30, as best shown in FIGURES 6 through 9, and is secured by the twisting thereof in conventional manner.

From the foregoing description, it will be understood that the rotation appliance or spring 10 of the invention is rigidly secured to the tooth by the structure involving the band 12, the bracket 14, and by the manner in which the spring 10 is secured to the bracket in accordance with the present invention. It will be understood that force exerted on or by the spring is transmitted to the tooth by reason of this structure.

As hereinbefore described, the arch wire 16 fits accurately between the sides of the groove 26, in the manner indicated in FIGURES 2 and 4. The extending or cantilever portion 54 of the spring bears against the inner surface of the arch wire, as shown, and is stressed or deformed, thereby exerting torsional or rotative force on the tooth bracket and on the tooth, as indicated by the arrows 70 in FIGURE 3. The torsional force tends to rotate the tooth about its axis to effect the desired corrective action. It will be appreciated that the corrective force is effectively applied without applying any undesired repositioning force on the tooth.

In FIGURE 11, there is illustrated the assembly of the rotation spring 10 of the invention with a conventional type of tooth bracket 72 which is, in effect, two brackets 14 positioned in spaced relation on a common base 74. The assembly of the spring to this type of bracket is similar to that hereinbefore described and the operation of the spring 10 in such assembly is generally similar to that hereinbefore described.

Although the preferred embodiment of the invention herein described utilizes side walls, these may be eliminated. In utilizing the invention without the side walls, the ligature wire extends through the roll or fold 52 of rotation spring, and the spring is secured to the tooth bracket by means of a ligature wire in the manner hereinbefore described. The corrective torsional force is applied to the tooth by the extending bowed portion 54 of the spring. The engagement of the fold or roll portion 52 of the spring against the ledge portion 22 and against the end surface of the bracket provides adequate rigidity.

The rotation spring is preferably preassembled with a ligature wire prior to its being installed on a tooth by an orthodontist. Such preassembly reduces the time and effort required of the orthodontist in installing the rotation appliance. Further, the ligature wire provides a convenient means of handling the small rotation spring prior to and during its installation on a tooth.

From the foregoing description, those versed in the art will appreciate that the invention achieves the objects and advantages hereinbefore mentioned. It will be appreciated that additional advantages inherent in the invention are apparent from the foregoing description and from the manner in which the invention achieves its purposes.

Although a specific embodiment of the present invention has been illustrated and described herein, it will be understood that the same is merely exemplary of presently preferred embodiments capable of attaining the objects and advantages hereinbefore mentioned, and that the invention is not limited thereto; variations will be readily apparent to those versed in the art and the invention is entitled to the broadest interpretation within the terms of the appended claims.

The inventors claim:

1. An orthodontic rotation appliance for assembly with a tooth bracket and an arch wire, comprising a spring member defining a fold, fastening means engaging the fold and adapted to removably connect the spring member to the tooth bracket on a tooth, said spring member having a resilient extending portion adapted to be positioned to be stressed between the arch wire and the tooth bracket, and said spring member having means adapted solidly to engage surfaces of the tooth bracket to provide solid securement of the spring member to the tooth bracket, whereby said resilient extending portion constitutes a cantilever element extending from the tooth bracket and bearing against the arch wire, whereby the stress in the resilient extending portion produces torsional force on the bracket tending to rotate the tooth about its axis.

2. An orthodontic rotation appliance for assembly with an arch wire, comprising a tooth band and bracket unit adapted to be mounted on a tooth, a spring member having a resilient extending portion adapted to be positioned to be stressed between the arch wire and the tooth bracket, said spring member comprising an element folded back upon itself to define a fold, a ligature disposed in the fold and adapted to secure the spring member to the tooth bracket on a tooth, said tooth bracket having side and end surfaces and having laterally extending wing portions, said spring member having side walls adapted to extend beneath said wing portions and adapted to engage said surfaces of the tooth bracket to provide solid securement of the spring member to the tooth bracket, and said spring member having means whereby the stress in said resilient portion is applied as a force on the bracket tending to rotate the tooth about its axis.

3. An orthodontic rotation appliance for assembly with an arch wire, comprising a tooth band and bracket adapted to be mounted on a tooth, a spring member defining a fold, a ligature engaging the fold and adapted to removably secure the spring member to the tooth bracket on a tooth, said spring member having a resilient extending portion adapted to be positioned to be stressed between the arch wire and the tooth bracket, said tooth bracket having laterally extending wing portions and having a groove therebetween to accommodate the arch wire, said spring member having extending parallel side walls adapted to engage side surfaces of the tooth bracket beneath the wing portions to provide solid securement of the spring member to the tooth bracket, and said spring member having means whereby the stress in said resilient portion is applied as a force on the bracket tending to rotate the tooth about its axis.

4. An orthodontic rotation appliance for assembly with a tooth bracket having wing portions and with an arch wire, said appliance comprising a spring member having side walls adapted to engage tooth bracket surfaces beneath the bracket wing portions for firm and removable securement of the spring member to the tooth bracket without removing the arch wire from the tooth bracket, a ligature, said spring member being configurated to retain the ligature for preassembly of the spring member and the ligature prior to securement of the spring member to the tooth bracket by means of the ligature, said spring member having a resilient extending portion adapted to be stressed between the arch wire and the tooth bracket, and said spring member having means engaging the bracket on the same side thereof as said extending spring member portion, whereby the stress in said resilient portion is applied as a force on the bracket tending to rotate the tooth about its axis.

References Cited
UNITED STATES PATENTS

| | | | |
|---|---|---|---|
| 1,014,029 | 1/1912 | Angle | 32—14 |
| 1,821,171 | 9/1931 | Alkinson | 32—14 |
| 2,381,128 | 8/1945 | Laskin | 32—14 |

L. W. TRAPP, Primary Examiner